United States Patent
Ramberg

(10) Patent No.: US 8,950,541 B2
(45) Date of Patent: Feb. 10, 2015

(54) AERODYNAMIC AFTERTREATMENT

(76) Inventor: Charles E. Ramberg, Los Altos, CA (US)

(*) Notice: Subject to any disclaimer, the term of this patent is extended or adjusted under 35 U.S.C. 154(b) by 368 days.

(21) Appl. No.: 13/343,713

(22) Filed: Jan. 5, 2012

(65) Prior Publication Data

US 2012/0133176 A1 May 31, 2012

(51) Int. Cl.
*B62D 35/00* (2006.01)
*F01N 3/10* (2006.01)
*F01N 3/035* (2006.01)
*F01N 3/08* (2006.01)
*F01N 3/20* (2006.01)
*F01N 13/08* (2010.01)

(52) U.S. Cl.
CPC ............. *F01N 3/103* (2013.01); *B62D 35/001* (2013.01); *F01N 3/035* (2013.01); *F01N 3/0842* (2013.01); *F01N 3/2066* (2013.01); *F01N 13/082* (2013.01); *F01N 2450/30* (2013.01); *F01N 2450/40* (2013.01); *F01N 2590/08* (2013.01); *Y02T 10/24* (2013.01)
USPC .......................... 180/309; 296/180.2; 60/301

(58) Field of Classification Search
CPC ........ B62D 35/001; B60K 13/04; F01N 3/00; F01N 13/082; F01N 2450/40; F01N 2590/08; F01N 3/2066

USPC ............... 180/309; 296/180.1, 180.2; 60/272, 60/301, 311, 324; 220/562
See application file for complete search history.

(56) References Cited

U.S. PATENT DOCUMENTS

| | | | | |
|---|---|---|---|---|
| 4,018,472 A * | 4/1977 | Mason, Jr. | .................. | 296/180.2 |
| 4,102,548 A * | 7/1978 | Kangas | ...................... | 296/180.3 |
| 4,353,587 A * | 10/1982 | Brenholt | ..................... | 296/180.3 |
| 4,465,154 A * | 8/1984 | Hinderks | ...................... | 180/89.2 |
| 5,536,062 A * | 7/1996 | Spears | ....................... | 296/180.3 |
| 7,216,923 B2 * | 5/2007 | Wong et al. | .............. | 296/180.2 |
| 8,365,520 B2 * | 2/2013 | Klejeski et al. | .................. | 60/324 |
| 2008/0155950 A1 * | 7/2008 | Blackwell et al. | ............. | 55/522 |
| 2008/0314033 A1 * | 12/2008 | Aneja et al. | ..................... | 60/297 |
| 2011/0011665 A1 * | 1/2011 | Peterson et al. | ............. | 180/309 |

\* cited by examiner

*Primary Examiner* — John Walters
*Assistant Examiner* — Brian Swenson
(74) *Attorney, Agent, or Firm* — Bresbo AB

(57) ABSTRACT

Aspects provide for an engine and an aftertreatment system coupled to the engine and configured to treat an exhaust stream from the engine. The engine may be incorporated into a mobile piece of equipment (e.g., a truck). A fairing may be shaped to improve air flow during motion by reducing air resistance created by the aftertreatment system.

15 Claims, 3 Drawing Sheets

US 8,950,541 B2

AERODYNAMIC AFTERTREATMENT

TECHNICAL FIELD

The present invention relates reducing emissions from engines.

BACKGROUND

Transport of goods may require the use of engines, which may emit pollution such as hydrocarbons, oxides (CO, CO2, NOx), particulate matter, and the like. In some cases, reducing an emission of one pollutant may increase emission of another pollutant. Minimizing an integrated impact of pollution may require the optimization of emission of a large number of different pollutants.

SUMMARY OF THE INVENTION

This paper incorporates by reference U.S. patent application Ser. No. 12/183,917 (now U.S. Pat. No. 7,981,375), Ser. Nos. 13/171,489, 12/824,070, and 12/756,987. Various aspects provide for reducing pollution emitted during transportation. A combination of reduced CO2 emission and reduced criteria pollutant emission may result from an aftertreatment system and/or operation methods that combine to reduce integrated emission.

A tractor may include an engine and an aftertreatment system coupled to the engine. The aftertreatment system may treat the exhaust stream from the engine. Treatment may include reducing a concentration of one or more contaminants in the exhaust stream. The tractor may include a fairing, which may be shaped to improve a flow of air past the tractor, and more particularly past at least a portion of the aftertreatment system. The fairing may contain or otherwise be shaped to modify the airflow around at least a portion of the aftertreatment system in a manner that reduces air resistance.

In some cases, the fairing and portion of the aftertreatment system contained by the fairing are disposed above a cab of the tractor. For some tractors (e.g., a class 8 truck), a fairing and aftertreatment system may be sized and shaped to improve air flow past a trailer (e.g., an intermodal container trailer) configured to be towed by the tractor. The fairing may reduce fuel consumption of the engine, as compared to a similar tractor without the fairing, by at least 0.5%, or even 1% at a speed of 100 km/hr. The fairing and may reduce fuel consumption by at least 3% at a speed of 120 km/hr as compared to a similarly configured tractor without the fairing. Some embodiments may reduce fuel consumption by over 2% at 75 mph.

The aftertreatment system may include at least one of a DOC, DPF, SCR, SNCR, LNT, ammonia slip, and other reactors. In some cases, a reactor volume (e.g., a substrate volume) may be greater than 2, 3, 5, 7, 10, 15 or even 20 times a displacement of the engine. In some embodiments, an aftertreatment having reactor volume greater than 50 liters, 100 liters, 200 liters, or even 300 liters may be disposed above a cab of a tractor behind a fairing configured to improve air flow past the aftertreatment system.

Some aftertreatment systems (e.g., disposed above a cab) may be removably connected in a manner that provides for changing out a reactor from above (e.g., with a crane, lift, and the like). In some cases, an aftertreatment system may be disposed above a deck of a boat, and may include an exhaust tube having a valve (e.g., a flap) configured to seal an interior of the aftertreatment reactor during capsize. A large, sealed aftertreatment, disposed above the deck, may provide for "self righting" of a capsized boat.

An aftertreatment may include one or more portions, including first, second, third, fourth, or even fifth portions. In some cases, an aftertreatment system includes a DOC, DPF, SCR and ammonia slip reactor. Some portions may be disposed within a body of the tractor. A DPF may have a substrate volume greater than three, five, or even 10 times the engine displacement. An SCR may have a substrate volume greater than three, five, or even 10 times the engine displacement. An aftertreatment system may include a muffler.

A fairing may include a vent, which may be operable to allow air to pass through the fairing an interact with the aftertreatment system. In some operation, a reactor temperature is determined (e.g., measured), and the reactor is cooled by opening a valve in the fairing to allow air to pass through and cool the reactor. In one example, overtemperature conditions during regeneration of a DPF may be mitigated by opening one or more vents in a fairing containing the DPF.

In some cases, a fairing and aftertreatment system may be sized and shaped to match a locomotive, which may have an engine displacement of over 1000 liters. An aftertreatment system may be disposed on a roof of a construction tractor (e.g., a backhoe, bulldozer, and the like).

DETAILED DESCRIPTION OF THE INVENTION

Figure 1:
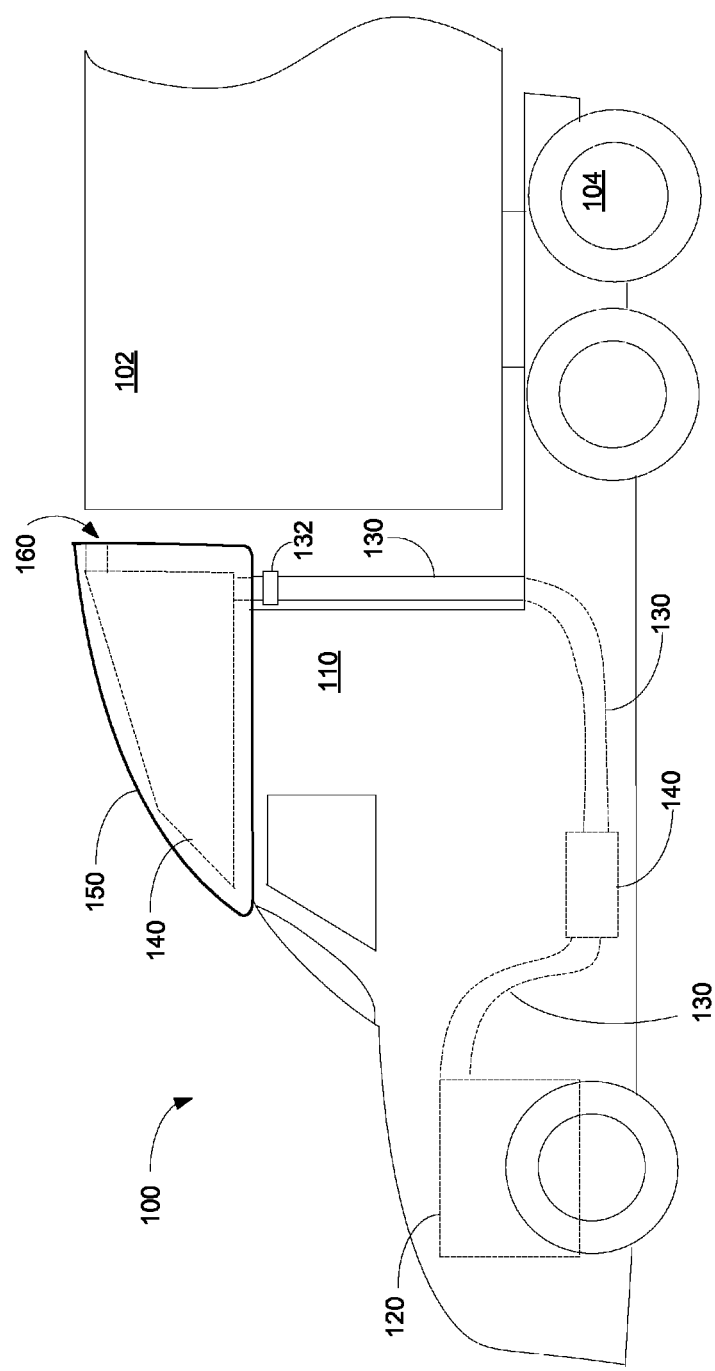
FIG. 1 illustrates an exemplary embodiment.

Various embodiments provide for combining an aftertreatment system and an aerodynamic fairing, which may enable the location of an aftertreatment system (e.g., a large aftertreatment system) in a wide range of places on a tractor. FIG. 1 illustrates an exemplary embodiment. Tractor 100 may include a truck, a train, a boat, a car, and/or another motive device configured to move a load (e.g., goods, people). In some embodiments, tractor 100 may be coupled with a trailer (e.g., trailer 102) to form a tractor-trailer. In some embodiments, tractor 100 may include an integral bed and/or compartment (not shown) configured to carry a load. Tractor 100 may include a heavy duty normal control truck.

Tractor 100 may include a variety of structural components (chassis, suspension, panels, fenders, bumpers, compartments, and the like), described herein as a body 110. Body 110 may house an engine 120, which may be a direct injection engine, an indirect injection engine, a compression induced ignition engine, a spark ignited engine, a diesel engine, a gasoline engine, an alcohol engine, a turbine, and the like. Engine 120 may be configured to move tractor 100 (e.g., by transmitting power to turn wheels 104). Engine 120 may be coupled (e.g., with one or more tubes 130) to aftertreatment 140. Aftertreatment 140 may comprise a system configured to reduce a concentration of one or more contaminants in an exhaust stream from engine 120. Exemplary contaminants include criteria pollutants such as particulate matter (PM), NOx, CO, hydrocarbons, climate forcing contaminants (e.g., CO2), and the like.

At least a portion of aftertreatment 140 may be shielded by, contained in, or otherwise "made aerodynamic" by fairing 150. Fairing 150 may be shaped to improve the aerodynamics of tractor 100 (e.g., reduce the aerodynamic drag associated with a flow of air past tractor 100 and/or trailer 102). Fairing 150 may be shaped to guide air around (e.g., at least the upstream face of) aftertreatment 140. Fairing 150 may substantially contain at least a portion of aftertreatment 140, and in some cases may be integrated with aftertreatment 140. In some embodiments, a first portion of aftertreatment 140 (e.g., a DOC) is external to fairing 150 (e.g., adjacent to engine 120), and a second portion of aftertreatment 140 (e.g., a DPF) is contained within fairing 150. Exhaust gases may exit aftertreatment system 140 via exhaust 160, which may be integrated with fairing 150.

In some embodiments, a portion of aftertreatment 140 is disposed substantially within body 110 (e.g., close coupled to engine 120). In some embodiments, a portion of aftertreatment 140 is disposed external to body 140 (e.g., attached to a chassis or frame member). A first portion may be disposed substantially within body 110, a second portion may be disposed outside body 110, and a third portion may be disposed behind fairing 150.

Aftertreatment system 140 may include one or more reactors, such as a Diesel Oxidation Catalyst reactor, a NOx trap reactor (e.g., a Lean NOx Trap), a selective catalytic reduction (SCR) reactor, a particulate filter (e.g., a diesel particulate filter, DPF), an ammonia slip reactor, and/or a selective non-catalytic reduction (SNCR) reactor. In some cases, a reactor volume may be associated with a volume of a substrate within a reactor. In some cases, a reactor volume may be associated with a volume of a "canned" reactor (e.g., a substrate contained within a sealed container having an inlet and outlet through which exhaust passes. A reactor volume may be more than twice as large as a displacement volume of an engine 120 associated with tractor 100. In some cases, reactor volume is at least three times, five times, or even ten times larger than the engine displacement. An aftertreatment system may have a volume (e.g., a reactor volume) greater than 40 gallons, 55 gallons, 100 gallons, or even 200 gallons. In some cases, a DPF reactor has a size greater than five times the engine displacement. In some cases, an SCR reactor has a size greater than three times the engine displacement. An exemplary reactor sized for a 10 liter engine may have a volume of at least 30 liters, including at least 50 liters, or even at least 100 liters.

In some cases, an aftertreatment 140 may include a DOC and DPF combined as a single unit (e.g., a DOC upstream of a DPF), which may be contained within fairing 150. An aftertreatment 140 contained by fairing 150 may include an SCR reactor, and may also include an ammonia slip reactor. A first portion of aftertreatment 140 may include a DOC close to engine 120 and a second portion of aftertreatment 140 a DPF reactor and SCR reactor within fairing 150. A first portion of aftertreatment 140 may include a DOC close to engine 120, a second portion of aftertreatment 140 may include a DPF after the DOC and before fairing 150 (e.g., behind a cab of tractor 100) and a third portion may include an SCR reactor contained by fairing 150. The position of various reactors (e.g., DOC, DPF, SCR) in the gas flow direction may be changed as desired. In some cases, a DOC, DPF and SCR are contained within fairing 150.

For some tractors 100, fairing 150 and at least a portion of aftertreatment system 140 may be disposed over body 110 (e.g., over the cab of tractor 100). A shape and height of the fairing 150 may be matched to an expected height of trailer 102, e.g., in a manner that reduces aerodynamic drag as compared to a tractor not having the fairing. In an exemplary case, a fairing 150 (e.g., for a US class 8 truck) may be somewhat wedge shaped (possibly with smoothed corners and/or convex or concave surfaces) and have a front edge disposed just above a windshield height, rising to a back edge having a height close to that of a trailer to be coupled to the truck, which may create a large "leeward" volume within which aftertreatment 140 may be disposed. An "over the cab" aftertreatment 140 may have a volume that is larger than that of prior aftertreatment systems, whose dimensions may be constrained by space and geometry (e.g., under-chassis size constraints). By sheltering a large aftertreatment 140 behind fairing 150, the benefits of a large aftertreatment (e.g., high soot storage capacity, high ash storage capacity, high surface area) may be achieved without reducing aerodynamic efficiency and/or being constrained by typical "on-chassis" installation locations. In some cases, an ash storage capacity of a DPF reactor associated with aftertreatment 140 may provide for greater than 100,000 miles of operation, greater than 500,000 miles of operation, or even greater than 1E6 miles of operation.

In some cases, a fuel consumption of tractor 100 having fairing 150 and contained aftertreatment system 140 may be reduced by more than 0.5%, 1%, 3%, or even 5% (e.g., at 100 km/hr) as compared to a tractor not having fairing 150. In some embodiments, the contained portion of aftertreatment 140 may be removably attached to exhaust tubes 130. In some cases, aftertreatment 140 and fairing 150 are connected, disposed above the cab of tractor 100, and may be removed by hoisting from above. In certain cases, at least one exhaust tube 130 may be removably coupled to aftertreatment 140 in a manner that provides for de-ashing a substrate associated with aftertreatment 140 (e.g., an aftertreatment 140 having a particulate filter). A coupling 132 may provide fluidic communication with exhaust 160 via at least a portion of aftertreatment 140. In some cases, a de-ashing apparatus may attach to exhaust 160 and coupling 132 to de-ash or otherwise regenerate at least a portion of aftertreatment 140. In some embodiments, an aftertreatment 140 may be located above a cab (e.g., of a tractor, bulldozer, backhoe, and the like) of a low speed or even stationary device. An "above cab" location may provide for removing an aftertreatment 140 to an area that does not block the view of an operator.

Figure 2:
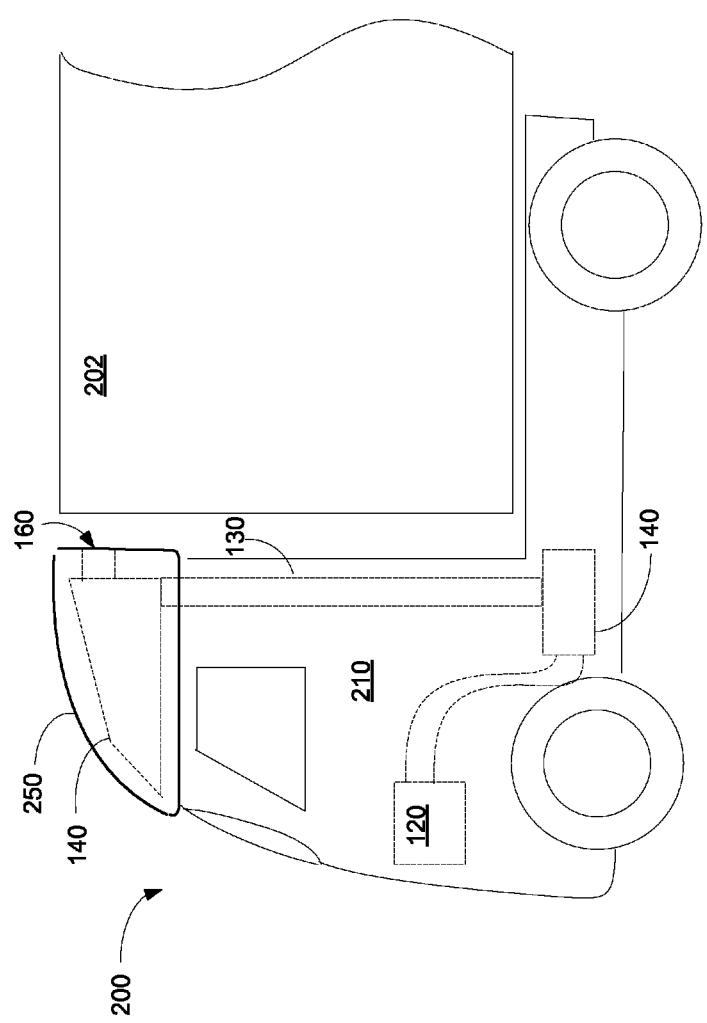
FIG. 2 illustrates an exemplary embodiment.

FIG. 2 illustrates an exemplary embodiment. Tractor 200 may include body 210, which may be configured as a "cab over engine" and/or forward control truck. Tractor 200 may be removably attachable to a trailer 202. In some embodiments, tractor 200 may be connected to trailer 202 as an integrated unit (e.g., as a box truck). In some embodiments, a fairing may contain a compressor (e.g., an air conditioner compressor).

Figure 3A:
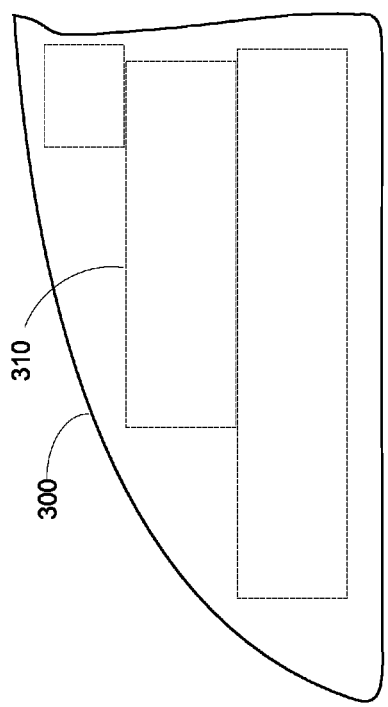
FIGS. 3A-3C illustrate various views of a select embodiment.
Figure 3C:
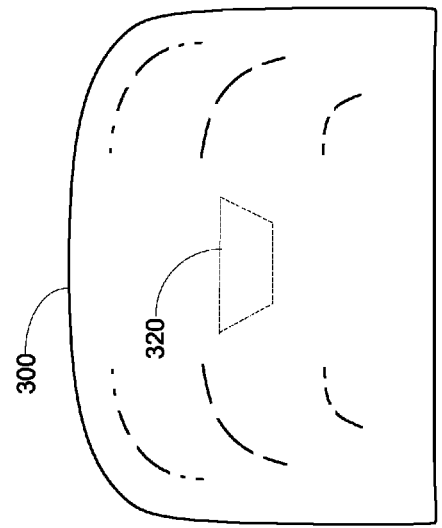
Figure 3B:
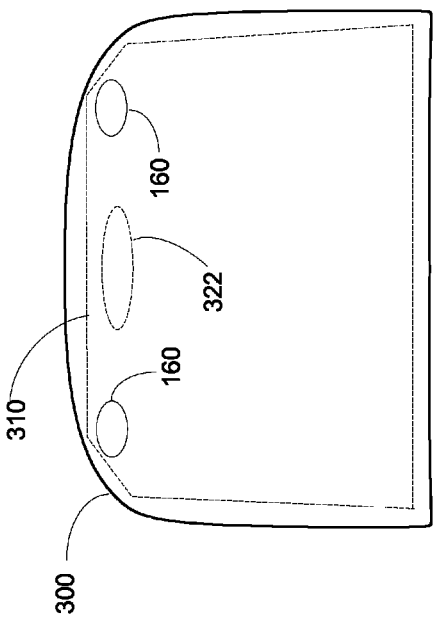

FIGS. 3A-3C illustrate various views of a select embodiment. FIG. 3A illustrates a first side view of a fairing 300 and integrated aftertreatment system 310. FIG. 3B illustrates a rear view, and shows an exemplary configuration for exhausts 160. FIG. 3C illustrates a front view, and shows an optional vent 320. In some embodiments, one or more vents 320 may be disposed in a fairing (e.g., fairing 300). A vent 320 may be adjustable (e.g., to vary from closed to open) to allow a desired amount of air to flow through fairing 300. In some embodiments, cold operation (e.g., while aftertreatment system 310 is cold) may include operating vent 320 in a closed position, and hot operation may include operating vent 320 in an open position. In some implementations, vent 320 may be opened during a period of time during which aftertreatment system 310 (e.g., having a filled particulate filter) is regenerated to burn of accumulated particulate matter). In some cases, vent 320 may be in communication with one or more powertrain control components (e.g., an engine control unit, ECU), and may be operated by the ECU to vary air flow through fairing 300 in concert with the operation of other engine controls. Vent 320 may include a plurality of vents (e.g., a first vent 320 on a front side of fairing 300 and a second vent 322 on a back side of fairing 300). One or both of the vents may be adjustable. An aftertreatment 140 may include a heat exchanger (e.g., for cooled exhaust gas recirculation, EGR). An heat exchanger may be disposed with vent 320 in a manner that allows air flow through vent 320 to control an amount of air flowing through the heat exchanger. Certain embodiments may include sensors (e.g., to sense temperature, contaminant concentration, soot loading, pressure, engine conditions, position, and the like) and/or actuators (e.g., to open/close valves). Some embodiments may include a processor, memory, and a computer readable storage medium having embodied thereon a program executable by the processor to perform a method.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A tractor comprising:
    an engine;
    an aftertreatment system coupled to the engine and configured to treat an exhaust stream from the engine to reduce a concentration of one or more contaminants in the exhaust stream, at least a portion of the aftertreatment system disposed above a cab of the tractor;
    a fairing above the cab, the fairing shaped to improve a flow of air past at least one of the tractor and a trailer coupled to the tractor, the portion of the aftertreatment system sheltered in a leeward volume behind the fairing with respect to a flow of air moving past the tractor; and
    a vent in the fairing, the vent coupled to an Engine Control Unit configured to control the engine, the vent configured to vary air flow through the fairing in concert with operation of the engine, the air flow through the vent interacting with at least a portion of the aftertreatment system sheltered within the fairing.

2. The tractor of claim 1, wherein a substrate volume of the portion is greater than 50 liters.

3. The tractor of claim 1, wherein the fairing has a front edge disposed just above a windshield height of the tractor, and a back edge having a height that matches a trailer height of a trailer that the tractor is configured to tow.

4. The tractor of claim 1, wherein an integrated substrate volume of the portion is greater than 100 liters.

5. The tractor of claim 1, wherein a substrate volume of the portion is greater than 300 liters.

6. The tractor of claim 1, wherein the portion of the aftertreatment system includes a particulate filter.

7. The tractor of claim 1, wherein the aftertreatment system includes one or more reactors having a reactor volume that is at least three times a displacement volume of the engine.

8. The tractor of claim 7, wherein the reactor volume is at least ten times a displacement of the engine.

9. The tractor of claim 1, wherein the aftertreatment system has a reactor volume greater than 55 gallons.

10. The tractor of claim 1, wherein the aftertreatment system comprises a substrate, and at least one exhaust tube of the aftertreatment system is removably coupled to the aftertreatment system in a manner that provides for de-ashing of the substrate while the aftertreatment system is connected to the tractor.

11. The tractor of claim 1, wherein the aftertreatment system further comprises a second portion disposed upstream of the sheltered portion, the second portion and sheltered portion treating different contaminants in the exhaust stream, the sheltered portion comprising one of a particulate filter and an SCR reactor, the second portion comprising the other of the particulate filter and the SCR reactor.

12. The tractor of claim 1, wherein the sheltered portion of the aftertreatment system comprises a diesel particulate filter having a substrate volume greater than 100 liters.

13. The tractor of claim 1, wherein the sheltered portion of the aftertreatment system includes an SCR reactor.

14. The tractor of claim 1, wherein the sheltered portion of the aftertreatment system includes a DPF having a reactor volume greater than five times a displacement volume of the engine.

15. The tractor of claim 1, wherein the vent is operable to open and close in response to a temperature of the exhaust stream.

* * * * *